No. 676,532. Patented June 18, 1901.
W. N. L. DAVIDSON.
CINEMATOGRAPH APPARATUS FOR REPRODUCTION IN NATURAL COLORS.
(Application filed June 23, 1900.)
(No Model.)

Witnesses
William James Cox.
Frank William Pattison.

Inventor
William Norman Lascelles Davidson
By his Attorney.
Geo. H. Rayner.

THE NORRIS PETERS CO., PHOTO-LITHO., WASHINGTON, D. C.

UNITED STATES PATENT OFFICE.

WILLIAM NORMAN LASCELLES DAVIDSON, OF SOUTHWICK, NEAR BRIGHTON, ENGLAND.

CINEMATOGRAPH APPARATUS FOR REPRODUCTION IN NATURAL COLORS.

SPECIFICATION forming part of Letters Patent No. 676,532, dated June 18, 1901.

Application filed June 23, 1900. Serial No. 21,357. (No model.)

*To all whom it may concern:*

Be it known that I, WILLIAM NORMAN LASCELLES DAVIDSON, of Rose Cottage, Southview road, Southwick, near Brighton, county of Sussex, England, have invented certain new and useful Improvements in Cinematograph Apparatus for Reproduction in Natural Colors, of which the following is a specification.

This invention relates to apparatus for use with cinematographs by means of which photographs may be taken and reproduced in natural colors by the well-known three-color process.

My apparatus consists, essentially, of a three-color screen, which is placed behind or in front of the revolving shutter already employed in such apparatus. This screen is of vulcanite or other suitable material and has three apertures filled in with celluloid or other transparent material having the required colors. The revolving shutter engages this screen at every revolution, turning the three colors successively behind the lens-aperture, so that each exposure is made with one color, the colors rapidly succeeding one another during the operation. For reproducing the photographs by an optical lantern or other suitable means a revolving screen is also employed, having openings filled in with colored transparent material, the three colors, however, being of different shades to the photographic color-screen. Both the screens are carried by similar brackets, which can be fitted to the same parts of the apparatus.

In order that this invention may be more readily understood, reference is had to the accompanying sheet of drawings, in which—

Figure 1:
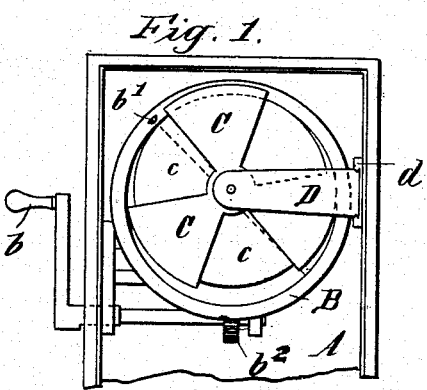
Figure 2:
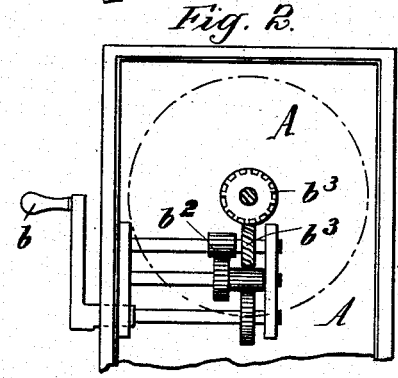
Figure 3:
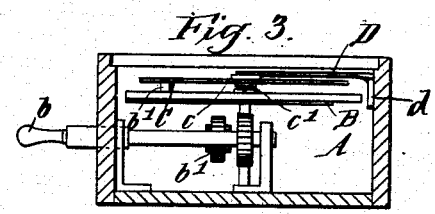
Figure 4:
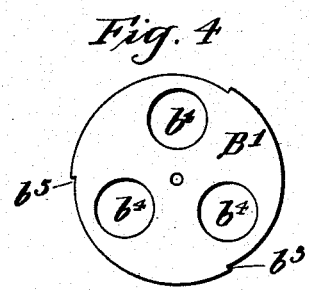

Figure 1 is an elevation of part of the interior of a cinematograph apparatus, showing my color-screen fitted to the revolving shutter at present employed. Fig. 2 is a similar view with the shutter and screens removed to show the gearing. Fig. 3 is an elevation with the case in section at right angles to Figs. 1 and 2. Fig. 4 shows the different form of screen more especially suitable for reproducing the photographs.

As the other parts of the apparatus are of any well-known construction, I have shown only those parts which are necessary to an understanding of my invention.

A is the case of the apparatus, which is placed in front of the camera or reproducing apparatus, and this case carries behind the lens-aperture the revolving shutter B, which is turned at high speed by suitable mechanism. In the apparatus shown the handle $b$ serves to revolve the shutter through the toothed gearing $b^2$ and the worm-wheels $b^3$, one of which is upon the spindle of the revolving shutter. These parts form no feature of my invention, and the shutter B may be rotated in any convenient manner. In front of the revolving shutter is placed my three-color screen C, having the colored transparent plates $c$ of the three colors required fitted between the arms forming the body of the screen. As already mentioned, the body of the screen may be formed of vulcanite or other light opaque material. This screen is carried by the detachable bracket D, the end of which is bent down and fixed by means of the plate $d$ to the side of the case A. The bracket is fixed so that the pivot of the screen is eccentric to the revolving shutter, and to adjust the tightness of the screen, preventing it turning too freely, the small nut $c'$ is employed, which can tighten the screen to any required extent.

On the revolving shutter B, I fix a pin $b'$, which projects from its surface to a suitable height and is adapted to engage the corners of the three arms forming my screen and to carry the screen around with the shutter the required distance for each revolution. As the screen is eccentric to the shutter, the pin engages at each revolution with one arm, turns the screen over about one-third of a circle before it disengages, and at the next revolution operates on the succeeding arm. Once in each revolution a fresh color is thus brought behind the exposing-aperture, the next exposure being through the succeeding color, and so on, each color repeating at every third exposure.

The screen B' (shown in Fig. 4) acts in exactly the same manner as that described; but I prefer it for use in reproducing photographs. It consists simply of a disk of vulcanite or like material having the apertures $b^4$ filled in with colored transparent material of different shades to the colors employed in the photographic screen. The edge of the disk is notched at $b^5$, and the pin on the revolving shutter engages in these notches, turning the screen, as already described.

What I claim as my invention, and desire to secure by Letters Patent, is—

1. In a cinematograph apparatus, the combination with a revolving shutter having a stud upon it of a revolving three-color screen pivoted behind the shutter but eccentric to it, and a detachable bracket carrying the said screen and secured to the case of the apparatus, the pin on the shutter engaging the revolving screen to bring the three-colored apertures successively into exposing position, substantially as described.

2. In a cinematograph apparatus, the combination with revolving shutter having a stud upon it of a three-color revolving screen having three radial arms and colored plates fitted between the said arms and a bracket carrying the screen and fitted to the side of the case containing the apparatus, the pivot of the screen being eccentric to the revolving shutter and the pin upon the latter engaging successively with the three arms, substantially as described and shown and for the purposes specified.

In testimony whereof I have signed my name to this specification in the presence of two subscribing witnesses.

WILLIAM NORMAN LASCELLES DAVIDSON.

Witnesses:
WALTER THORNHILL, Jr.,
WALTER THORNHILL.